United States Patent
Sinn et al.

(10) Patent No.: US 10,200,340 B2
(45) Date of Patent: *Feb. 5, 2019

(54) CLIENT TRAFFIC REDIRECTION SERVICE

(71) Applicant: Amazon Technologies, Inc., Seattle, WA (US)

(72) Inventors: Frederick David Sinn, Seattle, WA (US); Justin Pietsch, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/707,644

(22) Filed: May 8, 2015

(65) Prior Publication Data

US 2015/0244671 A1 Aug. 27, 2015

Related U.S. Application Data

(63) Continuation of application No. 13/338,452, filed on Dec. 28, 2011, now Pat. No. 9,032,092.

(51) Int. Cl.
*G06F 15/173* (2006.01)
*H04L 29/12* (2006.01)
*H04L 12/803* (2013.01)
*H04L 12/741* (2013.01)

(52) U.S. Cl.
CPC .......... *H04L 61/1511* (2013.01); *H04L 61/00* (2013.01); *H04L 61/256* (2013.01); *H04L 61/2514* (2013.01); *H04L 61/2557* (2013.01); *H04L 45/74* (2013.01); *H04L 47/125* (2013.01); *H04L 61/6004* (2013.01)

(58) Field of Classification Search
CPC . H04L 61/1511; H04L 61/00; H04L 61/2514; H04L 61/2557; H04L 61/256; H04L 45/74; H04L 47/125; H04L 61/6004
See application file for complete search history.

(56) References Cited

U.S. PATENT DOCUMENTS

| | | |
|---|---|---|
| 6,785,704 B1 | 8/2004 | McCanne |
| 7,296,155 B1 | 11/2007 | Trostle et al. |
| 7,653,745 B1 * | 1/2010 | Biswas ............ H04L 29/12283 370/230 |
| 8,279,776 B1 | 10/2012 | Everson et al. |
| 9,130,994 B1 * | 9/2015 | Newstadt ............ H04L 67/18 |
| 2002/0009079 A1 * | 1/2002 | Jungck ............ H04L 29/12066 370/389 |
| 2002/0038360 A1 * | 3/2002 | Andrews .......... H04L 29/12066 709/223 |
| 2003/0154306 A1 * | 8/2003 | Perry .............. H04L 29/12009 709/245 |

(Continued)

*Primary Examiner* — Suraj M Joshi
*Assistant Examiner* — Jaren Means
(74) *Attorney, Agent, or Firm* — Thomas | Horstemeyer, LLP; Michael J. D'Aurelio; Jason M. Perilla (57) ABSTRACT

Disclosed are various embodiments for performing network traffic redirection at the client side. Sending of data to a service at a network address is initiated. Whether the network address is in a predetermined network address range is determined. The network address is translated, when the network address is in the predetermined network address range, to one of multiple other network addresses based at least in part on an availability of the service at the other network address. The data is routed to the other network address.

20 Claims, 8 Drawing Sheets

(56) References Cited

U.S. PATENT DOCUMENTS

| | | | |
|---|---|---|---|
| 2007/0217421 A1* | 9/2007 | Kametani | H04L 29/12066 370/392 |
| 2010/0118869 A1* | 5/2010 | Li | H04L 29/12066 370/389 |
| 2012/0084382 A1 | 4/2012 | Robinson | |

* cited by examiner

CLIENT TRAFFIC REDIRECTION SERVICE

CROSS-REFERENCE TO RELATED APPLICATIONS

This application is a continuation of, and claims priority to, co-pending U.S. Patent Application entitled "CLIENT TRAFFIC REDIRECTION SERVICE," filed on Dec. 28, 2011, and assigned application Ser. No. 13/338,452, which is incorporated herein by reference in its entirety.

BACKGROUND

Load balancers may be employed to increase the availability of services in enterprise computing environments. Service clients connect to the load balancers, which then route data to and from one of multiple service providers for a particular service. For purposes of failover, multiple load balancers may be used in multiple data centers. In one example, anycast routing may be used to route traffic to multiple load balancers using a single network address. With anycast routing and internet protocol version 4 (IPv4), "/32" routes may be advertised for each service.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to client-side network traffic redirection. Enterprise computing environments may be heavily reliant on load balancers to ensure service availability and provide failover capability. In one example, network traffic for a service may be directed to an anycast address. When the traffic cannot be routed to a first load balancer associated with the anycast address, the network is able to route the traffic to a second load balancer also associated with the anycast address. However, such a configuration may not be scalable for networks with many services since the load balancers may be in different data centers and the anycast addresses may be incapable of aggregation. Consequently, the routing table size in the network may balloon in an unsustainable way.

Various embodiments of the present disclosure provide a client-side alternative for routing network traffic to services. Despite being client-based, the redirection may be completely transparent to the service client application. The service client connects to a service at a predetermined network address (or a predetermined domain name that resolves into a network address). The network address is in a special range of network addresses, which may normally be unroutable by the network. As used herein, the term "range of network addresses" is not limited to merely one subnetwork specifiable by a subnet mask or routing prefix. Thus, in some embodiments, a "range of network addresses" may include multiple subnetworks which may be non-contiguous.

In one embodiment, domain name system (DNS) queries may be used to translate the network address into an actual network address for the service. In another embodiment, a redirection coordination server may provide data to the client to facilitate translation of the network address into the actual network address for the service. A network address translation (NAT) filter in the client routes data destined for the network address to the actual network address. Consequently, the actual network addresses may be aggregable with the networks corresponding to the data centers, thereby reducing the routing table size. In the following discussion, a general description of the system and its components is provided, followed by a discussion of the operation of the same.

Figure 1:
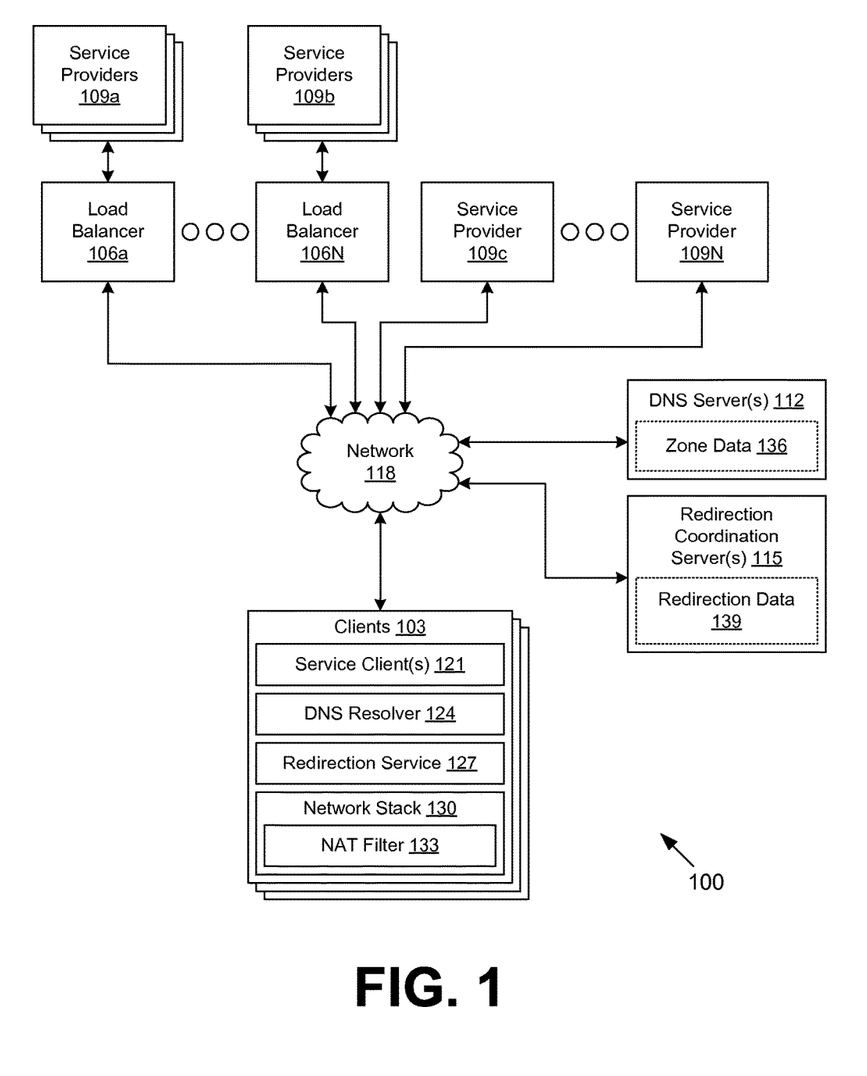
FIG. 1 is a drawing of a computing environment according to various embodiments of the present disclosure.

With reference to FIG. 1, shown is a computing environment 100 according to various embodiments. The computing environment 100 includes one or more clients 103 that may be in data communication with a plurality of load balancers 106a . . . 106N, a plurality of service providers 109a, 109b, 109c . . . 109N, one or more DNS servers 112, and one or more redirection coordination servers 115 by way of a network 118. The clients 103 may communicate with one or more of the service providers 109 by way of load balancers 106. The network 118 includes, for example, the Internet, intranets, extranets, wide area networks (WANs), local area networks (LANs), wired networks, wireless networks, or other suitable networks, etc., or any combination of two or more such networks.

The computing environment 100 may include a plurality of computing devices corresponding to the clients 103, the load balancers 106, the service providers 109, the DNS servers 112, and the redirection coordination servers 115. The computing devices may comprise, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations. It is understood that the load balancers 106, service providers 109, DNS servers 112, redirection coordination servers 115, may each be executed in respective computing device(s) with processor circuits having similar or different hardware characteristics.

Various applications and/or other functionality may be executed in the client 103 according to various embodiments. The components executed on the client 103 for example, include one or more service clients 121, a DNS resolver 124, a redirection service 127, a network stack 130, a NAT filter 133, and other applications, services, processes, systems, engines, or functionality not discussed in detail herein. The service client 121 is executed to generate service requests to a service implemented by a plurality of the service providers 109. To this end, the service client 121 may open a transmission control protocol/internet protocol (TCP/IP) connection, a user datagram protocol (UDP) connection, or otherwise send data to one of the service providers 109 by way of the network 118. The service client 121 may employ hypertext transfer protocol (HTTP), representational state transfer (REST), simple object access protocol (SOAP), and/or other application-layer architectures and protocols as desired.

The DNS resolver 124 is executed to perform DNS resolution of domain names and network addresses. The DNS resolver 124 may perform forward queries and reverse queries. In some embodiments, multiple different DNS resolvers 124 may be employed by the service clients 121 and the redirection service 127. The redirection service 127 is executed to configure the NAT filter 133 to route between redirection network addresses for services and actual network addresses of service providers 109 or load balancers 106 for the services. In one embodiment, the redirection service 127 is implemented as a user-space application of the operating system of the client 103. The network stack 130, which may support TCP, UDP, IP, and/or other protocols, includes the NAT filter 133 to perform the address translation according to configured rules. In one embodiment, the network stack 130 and the NAT filter 133 are kernel-space applications of the operating system of the client 103.

The service providers 109 are configured to respond to service requests from service clients 121 for a particular service. One or more of the service providers 109 may be executed in a server computing device similar to the client 103. Each load balancer 106 is configured to route traffic among multiple service providers 109 for the same service. Each load balancer 106 may correspond to a general-purpose computing device or a special-purpose computing device in the computing environment 100. In some cases, multiple service providers 109 for the same service may be located in one data center, and multiple other service providers 109 for the same service may be located in another data center.

The DNS servers 112 are authoritative for the domain names employed in the computing environment 100. To this end, the DNS servers 112 are configured to respond to DNS queries from the DNS resolver 124. In some cases, multiple DNS servers 112 may be arranged hierarchically to perform recursive DNS lookups within the computing environment 100. The DNS servers 112 include zone data 136 for the domain names in the computing environment 100. The DNS servers 112 may correspond to one or more server computing devices. In various embodiments, the DNS servers 112 may execute commercially available DNS server daemons such as, for example, Berkeley Internet Name Daemon (BIND), Microsoft® DNS, and/or other DNS server software.

The redirection coordination servers 115 are configured to control traffic redirection changes by the redirection services 127. To this end, the redirection coordination servers 115 may assess the status of various load balancers 106 and/or service providers 109 and configure or reconfigure the redirection services 127 to forward service requests for a service to an available load balancer 106 or service provider 109. The redirection coordination servers 115 may maintain state data as redirection data 139. In one embodiment, the redirection coordination servers 115 may modify the zone data 136 to update the records for reverse DNS for service network addresses. In other embodiments, the redirection coordination servers 115 may provide mapping data to the redirection service 127 directly, with either a push or pull arrangement. The redirection coordination servers 115 may correspond to one or more server computing devices.

Next, a general description of the operation of the various components of the computing environment 100 is provided. To begin, service clients 121 are deployed on clients 103 for various services offered in the computing environment 100. Under the architecture described herein, a developer need not be aware of the network address translation that occurs client-side. To the contrary, the developer may configure the service client 121 to use a fixed or predetermined generic domain name or network address that can be routed to any of the appropriate service providers 109 for the service as desired.

A naïve implementation of client-side traffic redirection might push frequent updates for the forward DNS resolution of the network address for the service client 121. However, such an approach can be problematic, as the DNS was designed to provide redundancy on the order of days, not seconds. The DNS standard calls for a minimum time for retaining records of 60 seconds. Nonetheless, many DNS resolvers 124 may ignore the time-to-live (TTL) for the records.

By contrast, various embodiments herein add a layer of redirection using client-side NAT. The redirection network addresses used by the service clients 121 may be in a special range of network addresses. When a NAT filter 133 in the client 103 sees data destined to such an address, special processing is invoked. The data is provided to the redirection service 127 which translates the redirection network address into an actual network address. The actual network address may correspond to a load balancer 106 or to a service provider 109. It is noted that the redirection network address may be translated into one of multiple actual network addresses depending on the availability of the service through the particular actual network address.

The redirection service 127 then configures a translation rule for the NAT filter 133, so that the NAT filter 133 is able to forward the data to the network 118 using the actual network address. Reverse NAT may be performed by the NAT filter 133 in the opposite direction, i.e., from actual network address to redirection network address, to enable the translation to be transparent from the perspective of the service client 121. In some embodiments, port address translation (PAT) may be similarly used and facilitated by the NAT filter 133.

Under one approach, the redirection service 127 may use reverse DNS in order to transform the redirection network address into the actual network address. For example, the redirection service 127 may resolve the "in-addr.arpa" domain corresponding to the redirection network address to obtain another domain name and ultimately the actual network address. When a service provider 109 or load balancer 106 becomes unavailable, the redirection service 127 may resolve the redirection network address to a different actual network address. The DNS updating may be prompted at least in part by the redirection coordination server 115. Also, to facilitate fast failover, the redirection service 127 may use a DNS resolver 124 that specifically obeys the TTL parameter or is modified for faster refresh. Likewise, the DNS server 112 may be specially configured to prevent DNS serial number exhaustion in the zone data 136.

Under another approach, the redirection service 127 performs the mapping of redirection network addresses to actual network addresses and configures the NAT filter 133. Data to facilitate the mapping may be pushed to the redirection service 127 by the redirection coordination server 115. Alternatively, data to facilitate the mapping may be pulled from the redirection coordination server 115 by the redirection service 127.

The NAT rules may be updated as needed for failover or for configuration changes. It may be determined that the service is unavailable at the particular actual network address. In response, another network address translation may be established in the NAT filter 133 between the redirection network address and another actual network address to replace the previous network address translation.

In some embodiments, the redirection service 127 may perform the sole load balancing function for certain services. Some services may not need the full intelligence of a hardware load balancer 106 and may function acceptably with the random or pseudo-random application of multiple local NAT rules for a redirection network address. The data provided by the redirection coordination server 115 to the redirection service 127 may provide context on what NAT rule to apply. For example, the data provided by the redirection coordination server 115 may indicate proportions of flows to translate to a given redirection network address, translation based at least in part on existing local flow data (e.g., do not translate to an address that is only in "SYN" state, one that has a backlog of packets, etc.), and so on.

Figure 2A:
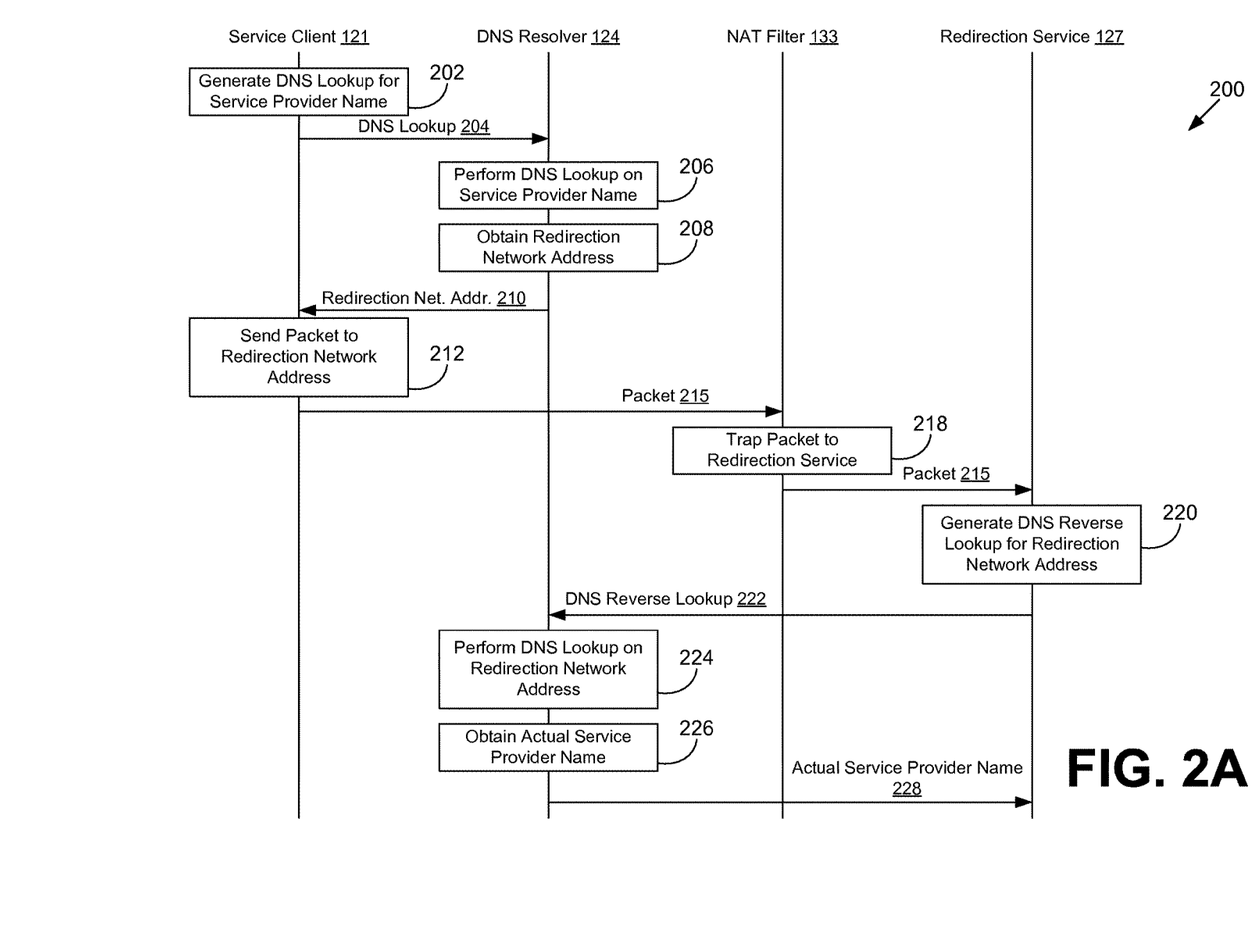
FIGS. 2A and 2B depict a sequence diagram illustrating an example of interaction among a service client, a DNS resolver, a NAT filter, a redirection service, and a service provider in the computing environment of FIG. 1 according to various embodiments of the present disclosure.
Figure 2B:
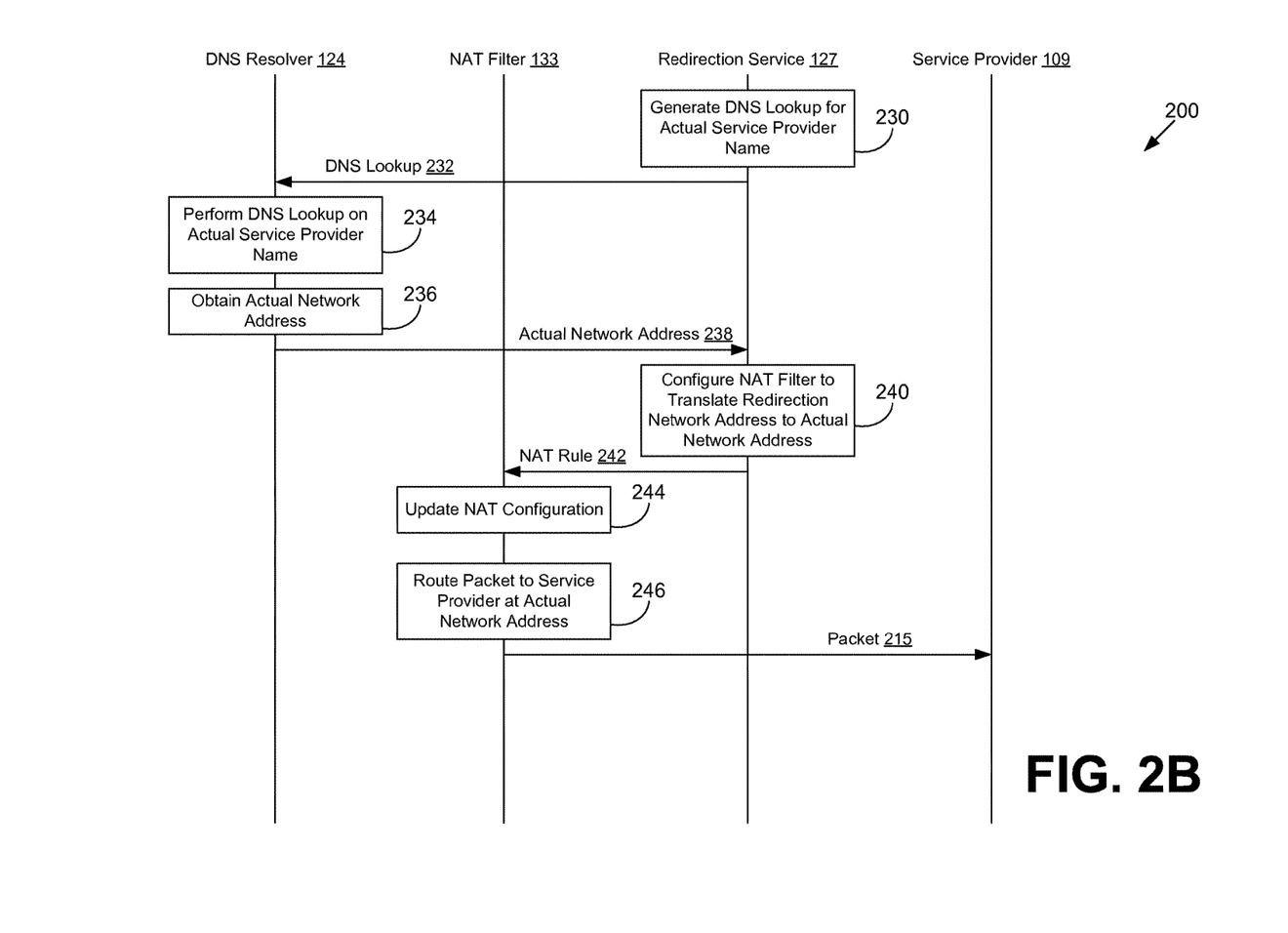

Referring next to FIGS. 2A and 2B, shown is a sequence diagram 200 that provides one example of the operation and interaction of portions of the service client 121, the DNS resolver 124, the NAT filter 133, the redirection service 127, and the service provider 109 according to various embodiments. It is understood that the sequence diagram 200 of FIGS. 2A and 2B provides merely an example of the many different types of functional arrangements that may be employed to implement the operation of the portions of the service client 121, the DNS resolver 124, the NAT filter 133, the redirection service 127, and the service provider 109 as described herein.

Beginning with box 202 of FIG. 2A, the service client 121 generates a DNS lookup 204 for a domain name of a service provider 109. The domain name may be predetermined in the service client 121 and may correspond to the service generally. In box 206, the DNS resolver 124 obtains the DNS lookup 204 and performs the DNS lookup 204 on the domain name of the service provider 109. To this end, the DNS resolver 124 may query a DNS server 112 (FIG. 1) or may resolve the domain name from a cache. In box 208, the DNS resolver 124 obtains a redirection network address 210, which is then returned to the service client 121. In other embodiments, the redirection network address 210 may be cached or predetermined by the service client 121, thereby rendering the DNS lookup 204 extraneous.

In box 212, the service client 121 sends a packet 215 to the redirection network address 210. For example, the service client 121 may initiate sending a datagram to the redirection network address or may open a connection to the redirection network address 210. The packet 215 is provided to the network stack 130 (FIG. 1) and is processed by the NAT filter 133. In box 218, upon determining that the packet 215 has a network address in a special range of network addresses, the NAT filter 133 traps the packet 215 to the redirection service 127, which may be a user-space application. In box 220, the redirection service 127 generates a DNS reverse lookup 222 for the redirection network address 210 corresponding to the destination address of the packet 215.

The DNS reverse lookup 222 is passed to the DNS resolver 124, which performs a DNS lookup on the redirection network address 210 in box 224. In box 226, the DNS resolver 124 obtains the actual service provider 109 domain name 228 (or the actual load balancer 106 (FIG. 1) domain name, as the case may be) from the DNS server 112 or a cache. In one embodiment, round-robin DNS may be employed, meaning that one of several actual service provider names 228 may be returned. The actual service provider name 228 is returned to the redirection service 127.

In box 230 of FIG. 2B, the redirection service 127 generates a DNS lookup 232 for the actual service provider name 228. In box 234, the DNS resolver 124 performs the DNS lookup 232 on the actual service provider name 228. In box 236, the DNS resolver 124 obtains the actual network address 238, which is then returned to the redirection service 127. In box 240, the redirection service 127 configures the NAT filter 133 to translate the redirection network address 210 into the actual network address 238, and vice versa. To this end, a NAT rule 242 is supplied to the NAT filter 133, and the NAT filter 133 updates the NAT configuration accordingly in box 244. In box 246, the NAT filter 133 routes the packet 215 to the service provider 109 (or load balancer 106) at the actual network address 238. Thereafter, the sequence diagram 200 ends.

Figure 3:
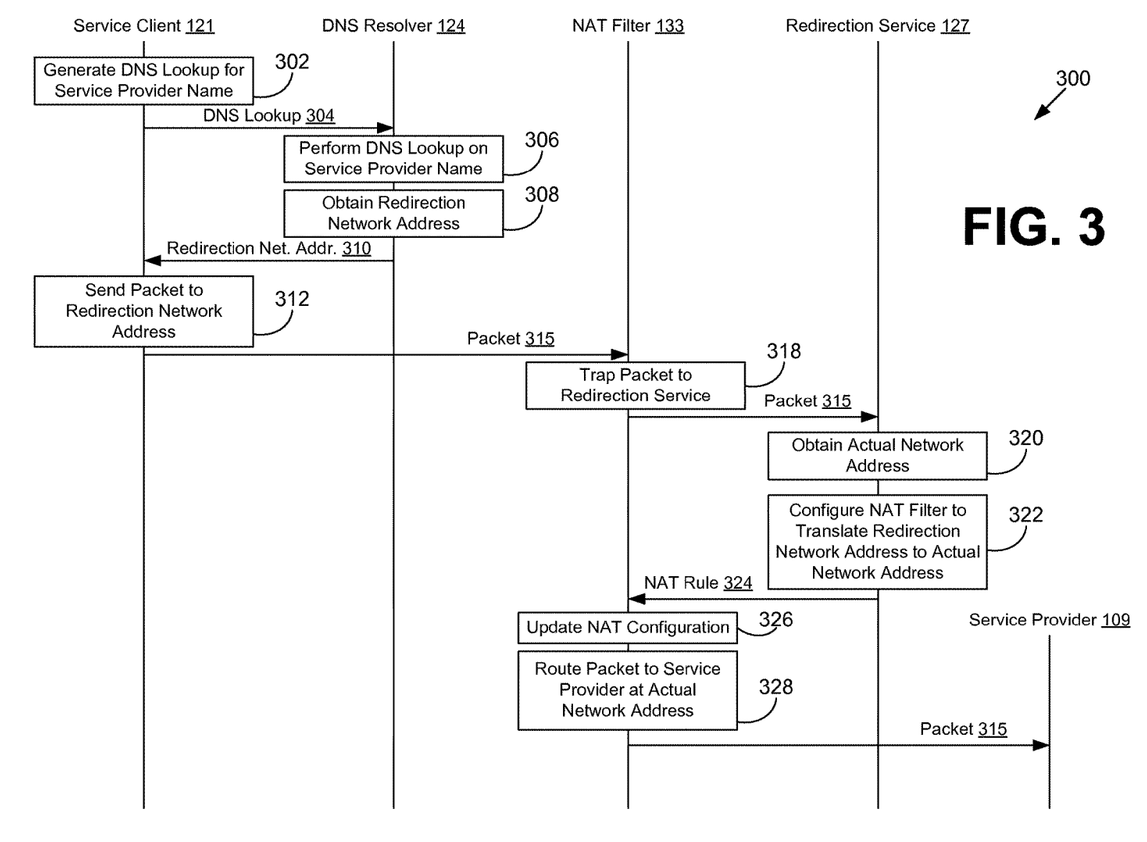
FIG. 3 depicts a sequence diagram illustrating another example of interaction among a service client, a DNS resolver, a NAT filter, a redirection service, and a service provider in the computing environment of FIG. 1 according to various embodiments of the present disclosure.

Turning now to FIG. 3, shown is a sequence diagram 300 that provides another example of the operation and interaction of portions of the service client 121, the DNS resolver 124, the NAT filter 133, the redirection service 127, and the service provider 109 according to various embodiments. It is understood that the sequence diagram 300 of FIG. 3 provides merely an example of the many different types of functional arrangements that may be employed to implement the operation of the portions of the service client 121, the DNS resolver 124, the NAT filter 133, the redirection service 127, and the service provider 109 as described herein.

Beginning with box 302, the service client 121 generates a DNS lookup 304 for a domain name of a service provider 109. The domain name may be predetermined in the service client 121 and may correspond to the service generally. In box 306, the DNS resolver 124 obtains the DNS lookup 304 and performs the DNS lookup 304 on the domain name of the service provider 109. To this end, the DNS resolver 124 may query a DNS server 112 (FIG. 1) or may resolve the domain name from a cache. In box 308, the DNS resolver obtains a redirection network address 310, which is then returned to the service client 121. In other embodiments, the redirection network address 310 may be cached or predetermined by the service client 121, thereby rendering the DNS lookup 304 extraneous.

In box 312, the service client 121 sends a packet 315 to the redirection network address 310. For example, the service client 121 may initiate sending a datagram to the redirection network address 310 or may open a connection to the redirection network address 310. The packet 315 is provided to the network stack 130 (FIG. 1) and is processed by the NAT filter 133. In box 318, upon determining that the packet 315 has a network address in a special range of network addresses, the NAT filter 133 traps the packet 315 to the redirection service 127, which may be a user-space application. In box 320, the redirection service 127 obtains the actual network address corresponding to the redirection network address 310 from the redirection coordination server 115 (FIG. 1).

In box 322, the redirection service 127 configures the NAT filter 133 to translate the redirection network address 310 into the actual network address obtained from the redirection coordination server 115, and vice versa. To this end, a NAT rule 324 is supplied to the NAT filter 133, and the NAT filter 133 updates the NAT configuration accordingly in box 326. In box 328, the NAT filter 133 routes the packet 315 to the service provider 109 (or load balancer 106 (FIG. 1)) at the actual network address. Thereafter, the sequence diagram 300 ends.

Figure 4:
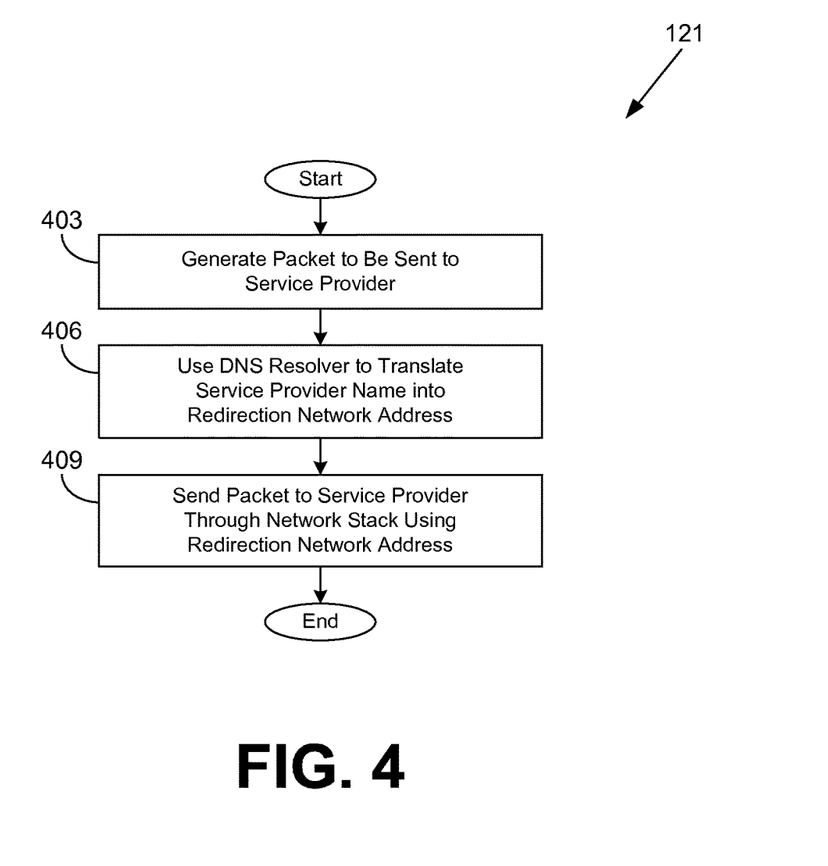
FIG. 4 is a flowchart illustrating one example of functionality implemented as portions of a service client executed in a computing device in the computing environment of FIG. 1 according to various embodiments of the present disclosure.

Moving on to FIG. 4, shown is a flowchart that provides one example of the operation of a portion of the service client 121 according to various embodiments. It is understood that the flowchart of FIG. 4 provides merely an example of the many different types of functional arrangements that may be employed to implement the operation of the portion of the service client 121 as described herein. As an alternative, the flowchart of FIG. 4 may be viewed as depicting an example of steps of a method implemented in the client 103 (FIG. 1) according to one or more embodiments.

Beginning with box 403, the service client 121 generates a packet to be sent to a service provider 109 (FIG. 1) for a service. In box 406, the service client 121 uses the DNS resolver 124 (FIG. 1) to translate a domain name of the service provider 109 into a redirection network address in a predetermined redirection network address range. Such an address range may be non-routable by the network 118 (FIG. 1) in some embodiments. In box 409, the service client 121 sends the packet to the service provider 109 through the network stack 130 (FIG. 1) using the redirection network address. Thereafter, the portion of the service client 121 ends.

Figure 5:
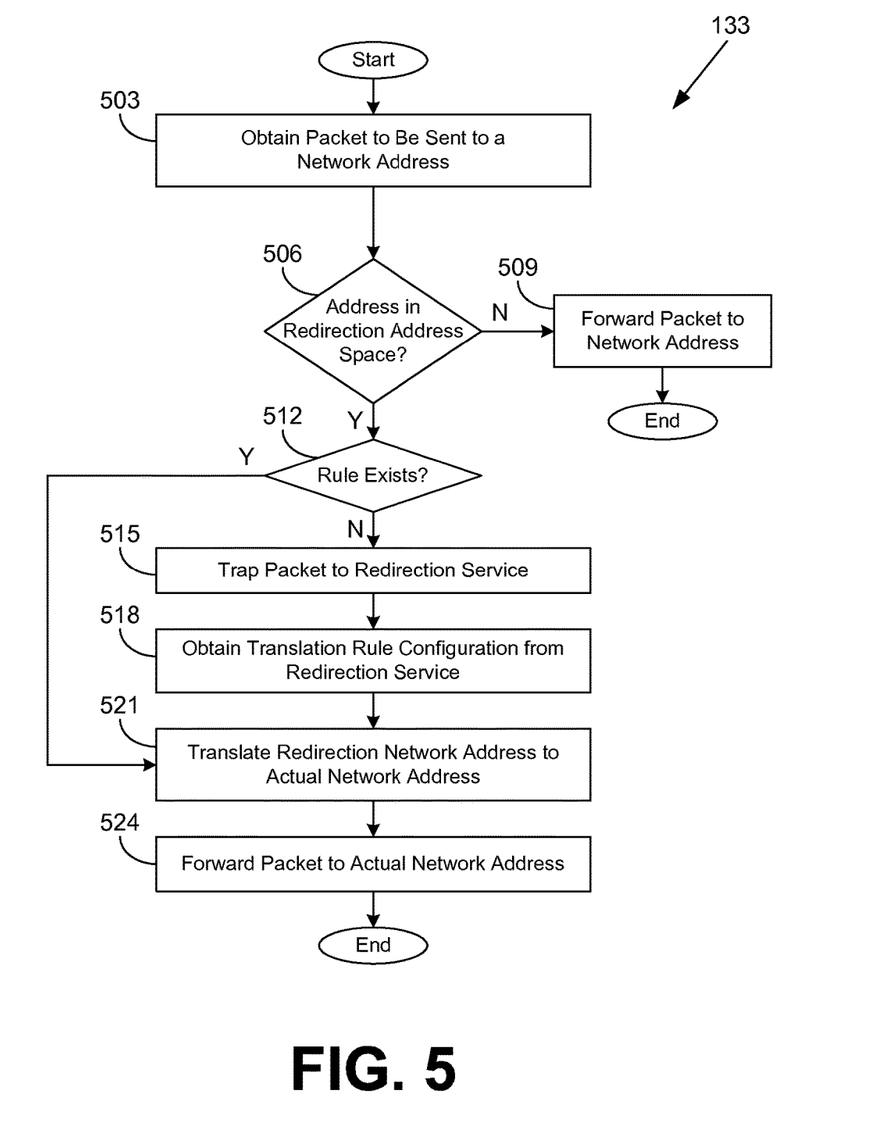
FIG. 5 is a flowchart illustrating one example of functionality implemented as portions of a network address translation filter executed in a computing device in the computing environment of FIG. 1 according to various embodiments of the present disclosure.

Continuing now to FIG. 5, shown is a flowchart that provides one example of the operation of a portion of the NAT filter 133 according to various embodiments. It is understood that the flowchart of FIG. 5 provides merely an example of the many different types of functional arrangements that may be employed to implement the operation of the portion of the NAT filter 133 as described herein. As an alternative, the flowchart of FIG. 5 may be viewed as depicting an example of steps of a method implemented in the client 103 (FIG. 1) according to one or more embodiments.

Beginning with box 503, the NAT filter 133 obtains a packet to be sent to a destination network address. In box 506, the NAT filter 133 determines whether the destination network address is in a predetermined redirection address space. If the destination network address is not in the predetermined redirection address space, the NAT filter 133 simply forwards the packet to the destination network address via the network 118 (FIG. 1) in box 509. Thereafter, the portion of the NAT filter 133 ends.

If, instead, the NAT filter 133 determines that the destination network address is in the redirection address space, the NAT filter 133 moves from box 506 to box 512. In box 512, the NAT filter 133 determines whether a translation rule exists and is valid for the particular destination network address. If a translation rule does not already exist, the NAT filter 133 continues to box 515 and traps the packet to the redirection service 127 (FIG. 1). In box 518, the NAT filter 133 obtains a translation rule configuration from the redirection service 127.

The NAT filter 133 then proceeds to box 521. If the NAT filter 133 instead determines that a translation rule already exists and is valid, the NAT filter 133 moves from box 512 to box 521. In box 521, the NAT filter 133 translates the redirection network address into an actual network address that can be routed by the network 118. In box 524, the NAT filter 133 forwards the packet to the actual network address by way of the network 118. Thereafter, the portion of the NAT filter 133 ends.

Figure 6A:
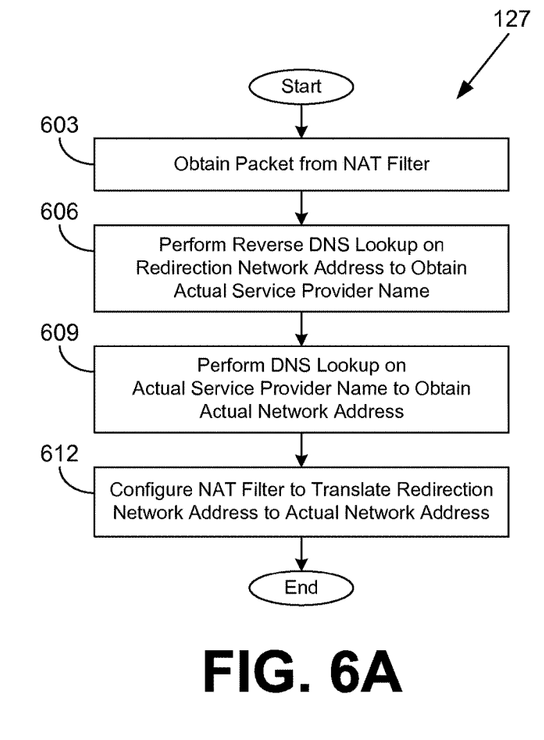
FIGS. 6A and 6B are flowcharts illustrating examples of functionality implemented as portions of a redirection service executed in a computing device in the computing environment of FIG. 1 according to various embodiments of the present disclosure.

Referring next to FIG. 6A, shown is a flowchart that provides one example of the operation of a portion of the redirection service 127 according to a first embodiment. It is understood that the flowchart of FIG. 6A provides merely an example of the many different types of functional arrangements that may be employed to implement the operation of the portion of the redirection service 127 as described herein. As an alternative, the flowchart of FIG. 6A may be viewed as depicting an example of steps of a method implemented in the client 103 (FIG. 1) according to one or more embodiments.

In box 603, the redirection service 127 obtains a packet (or information about the packet) from the NAT filter 133 (FIG. 1). In box 606, the redirection service 127 performs a reverse DNS lookup using the DNS resolver 124 (FIG. 1) on the redirection network address included in the packet to obtain an actual service provider 109 (FIG. 1) (or load balancer 106 (FIG. 1)) domain name. In box 609, the redirection service 127 performs a DNS lookup using the DNS resolver 124 on the actual domain name to obtain an actual network address. In box 612, the redirection service 127 configures a translation rule in the NAT filter 133 to translate between the redirection network address and the actual network address. Thereafter, the portion of the redirection service 127 ends. The translation rule configured in box 612 may later be updated to accommodate failover.

Figure 6B:
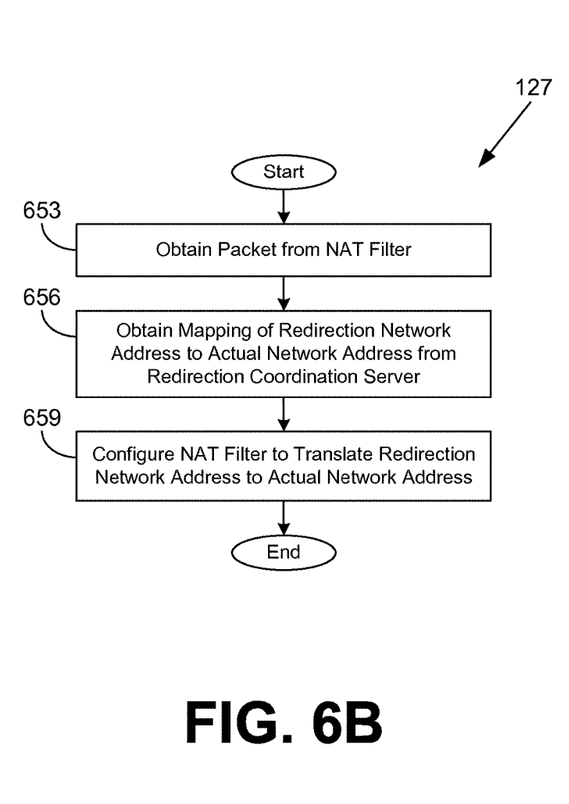

Turning now to FIG. 6B, shown is a flowchart that provides one example of the operation of a portion of the redirection service 127 according to a second embodiment. It is understood that the flowchart of FIG. 6B provides merely an example of the many different types of functional arrangements that may be employed to implement the operation of the portion of the redirection service 127 as described herein. As an alternative, the flowchart of FIG. 6B may be viewed as depicting an example of steps of a method implemented in the client 103 (FIG. 1) according to one or more embodiments.

In box 653, the redirection service 127 obtains a packet (or information about the packet) from the NAT filter 133 (FIG. 1). In box 656, the NAT filter 133 obtains a mapping of the redirection network address to an actual network address from the redirection coordination server 115 (FIG. 1). In box 659, the redirection service 127 configures a translation rule in the NAT filter 133 to translate between the redirection network address and the actual network address. Thereafter, the portion of the redirection service 127 ends. The translation rule configured in box 659 may later be updated to accommodate failover.

Figure 7:
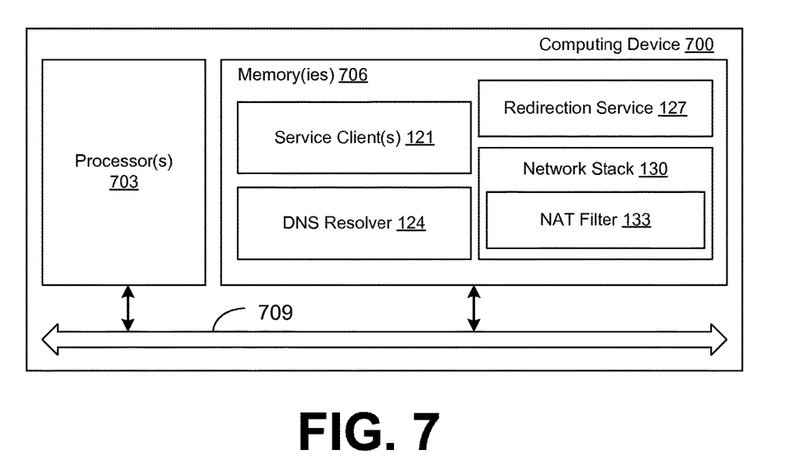
FIG. 7 is a schematic block diagram that provides one example illustration of a computing device employed in the computing environment of FIG. 1 according to various embodiments of the present disclosure.

With reference to FIG. 7, shown is a schematic block diagram of a computing device 700 which may be employed in the computing environment 100 (FIG. 1) according to an embodiment of the present disclosure. The computing device 700 may correspond, for example, to a client 103 (FIG. 1). The computing device 700 includes at least one processor circuit, for example, having a processor 703 and a memory 706, both of which are coupled to a local interface 709. To this end, the computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the service client 121, the DNS resolver 124, the redirection service 127, the network stack 130, the NAT filter 133, and potentially other applications. Also stored in the memory 706 may be a data store and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the service client 121, the DNS resolver 124, the redirection service 127, the network stack 130, the NAT filter 133, the redirection coordination server 115 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The sequence diagrams of FIGS. 2A, 2B, and 3 and the flowcharts of FIGS. 4-6 show the functionality and operation of an implementation of portions of the service client 121, the DNS resolver 124, the redirection service 127, the network stack 130, the NAT filter 133, and the service provider 109 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the sequence diagrams of FIGS. 2A, 2B, and 3 and the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 2A-6 may be executed concurrently or with partial concurrence. Further, in some embodiments, one or more of the blocks shown in FIGS. 2A-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the service client 121, the DNS resolver 124, the redirection service 127, the network stack 130, the NAT filter 133, and the redirection coordination server 115, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a client computing device coupled to a network, wherein when executed the program causes the client computing device to at least:
   receive data to be sent to a service at a first network address;
   determine whether the first network address is in a predetermined redirection network address range, the predetermined redirection network address range being unroutable by the network;
   perform a reverse domain name system (DNS) query on the first network address to obtain a domain name based at least in part on a determination that the first network address is in the predetermined redirection network address range;
   perform a forward DNS query on the domain name to obtain, based at least in part on an identification of a failure of the service at a third network address by a redirection computing device, a second network address instead of the third network address; and
   initiate routing of the data to the service at the second network address.

2. The non-transitory computer-readable medium of claim 1, wherein the data is received from a service client executed in the client computing device.

3. The non-transitory computer-readable medium of claim 1, wherein when executed the program further causes the client computing device to at least configure a network address translation (NAT) filter to establish a rule that routes from the first network address to the second network address.

4. The non-transitory computer-readable medium of claim 3, wherein when executed the program further causes the client computing device to at least configure the NAT filter to establish a reverse rule to route from the second network address to the first network address.

5. The non-transitory computer-readable medium of claim 1, wherein the reverse domain name system (DNS) query is performed in the client computing device.

6. The non-transitory computer-readable medium of claim 5, wherein the forward DNS query on the domain name is performed in the client computing device.

7. A system, comprising:
   at least one memory device to store computer-readable instructions thereon; and
   at least one computing device comprising a processor, wherein when executed by the processor the computer-readable instructions cause the at least one computing device to at least:
      determine a current status of a plurality of service providers that are configured to provide a service, the current status comprising availability of the service at a second network address and a failure of the service at a third network address;
      generate mapping data that maps a first network address in an unroutable network address range to the second network address based at least in part on the availability of the service at the second network address and the failure of the service at the third network address; and
      provide the mapping data to a redirection service executed in a client computing device.

8. The system of claim 7, wherein the mapping data indicates a proportion of data to be redirected from the first network address to the second network address.

9. The system of claim 7, wherein the client computing device is connected to a network, and the unroutable network address range is in a predetermined network address range for redirection by the network.

10. The system of claim 7, wherein the redirection service is configured by the mapping data to cause data sent by a service client to the first network address to be redirected to the second network address.

11. The system of claim 7, wherein the redirection service is configured by the mapping data to update a reverse domain name system (DNS) mapping for the first network address to point to a domain name corresponding to the second network address.

12. The system of claim 7, wherein the redirection service is configured by the mapping data to update a rule in a network address translation (NAT) filter executed in kernel space of the client computing device.

13. The system of claim 7, wherein the second network address corresponds to a load balancer for the at least one of the plurality of service providers.

14. The system of claim 7, wherein when executed the instructions further cause the at least one computing device to at least provide the mapping data to the redirection service via a push arrangement.

15. The system of claim 7, wherein when executed the instructions further cause the at least one computing device to at least provide the mapping data to the redirection service via a pull arrangement.

16. The system of claim 7, wherein the second network address and the third network address correspond to different ones of the plurality of service providers.

17. A method, comprising:
    determining, by at least one computing device, a current status of a plurality of service providers that are configured to provide a service, the current status comprising availability of the service at a second network address and a failure of the service at a third network address;
    generating, by the at least one computing device, mapping data that maps a first network address in an unroutable network address range to a second network address based at least in part on the availability of the service at the second network address and the failure of the service at the third network address; and
    configuring, by the at least one computing device, a domain name system (DNS) server to map a reverse DNS query for the first network address to a domain name corresponding to the second network address based on the mapping data.

18. The method of claim 17, wherein the domain name corresponding to the second network address is different than a domain name corresponding to the first network address.

19. The method of claim 17, wherein the unroutable network address range is in a predetermined network address range for redirection.

20. The method of claim 17, wherein the second network address corresponds to a load balancer for at least two of the plurality of service providers.

* * * * *